UNITED STATES PATENT OFFICE.

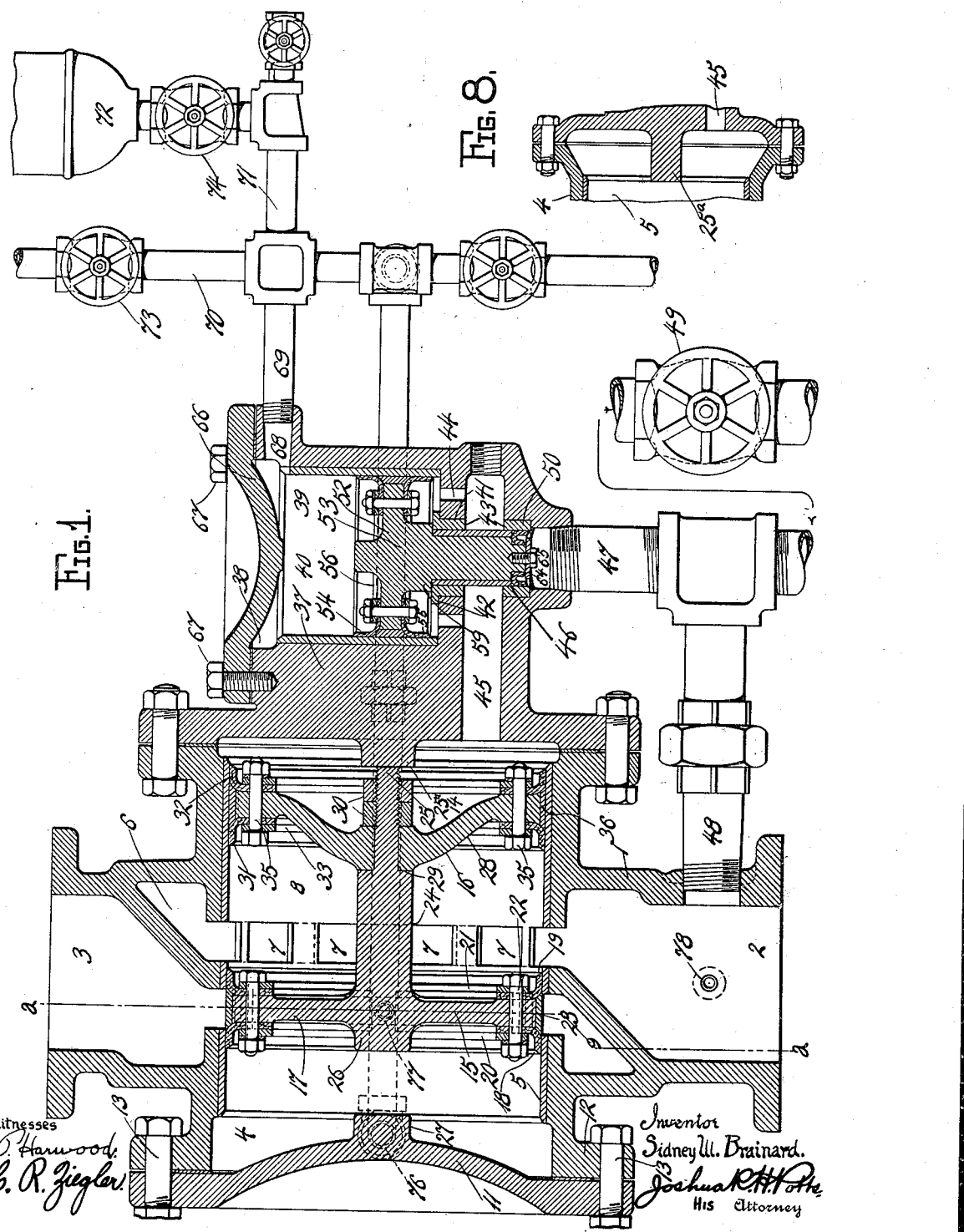

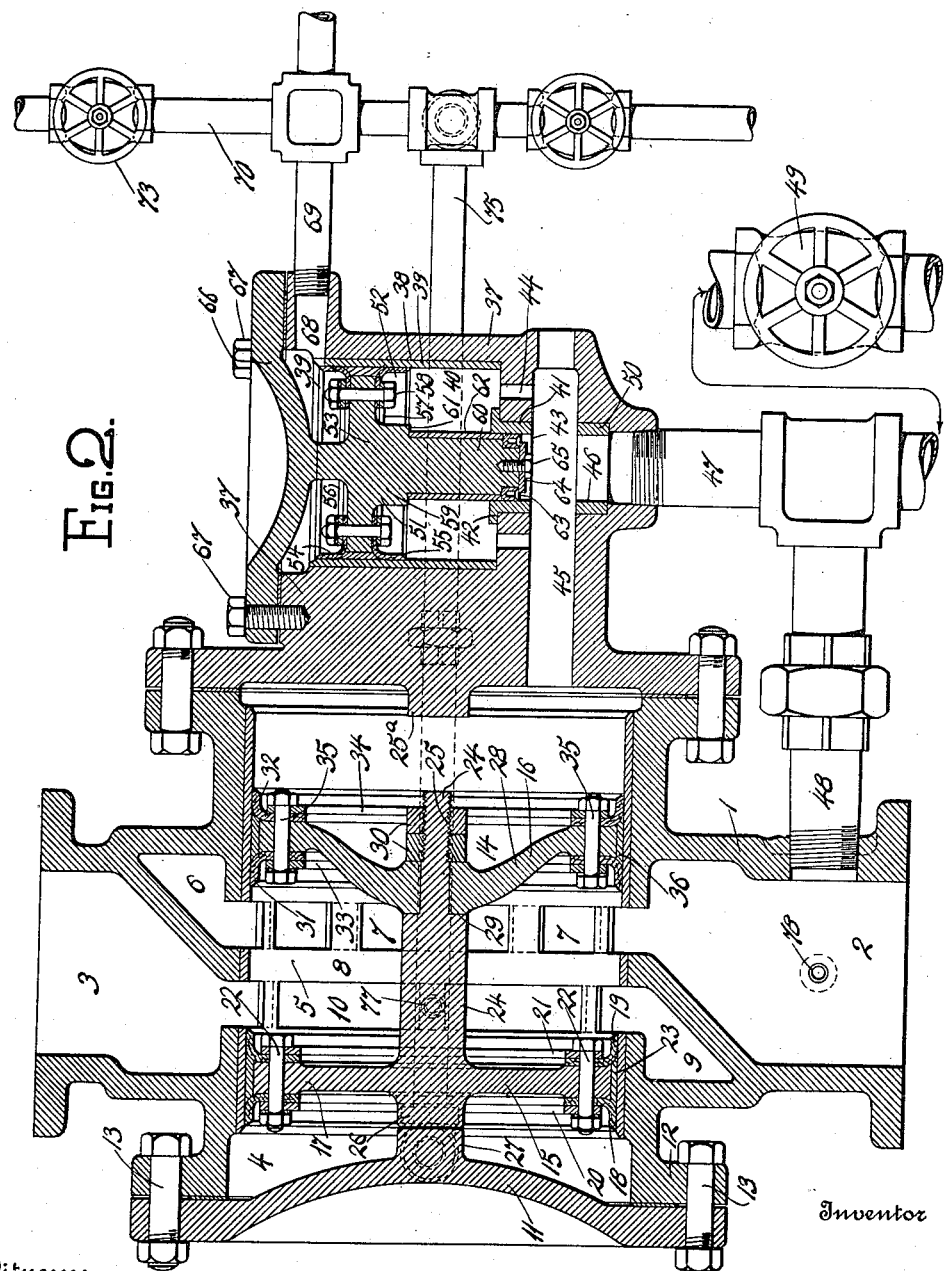

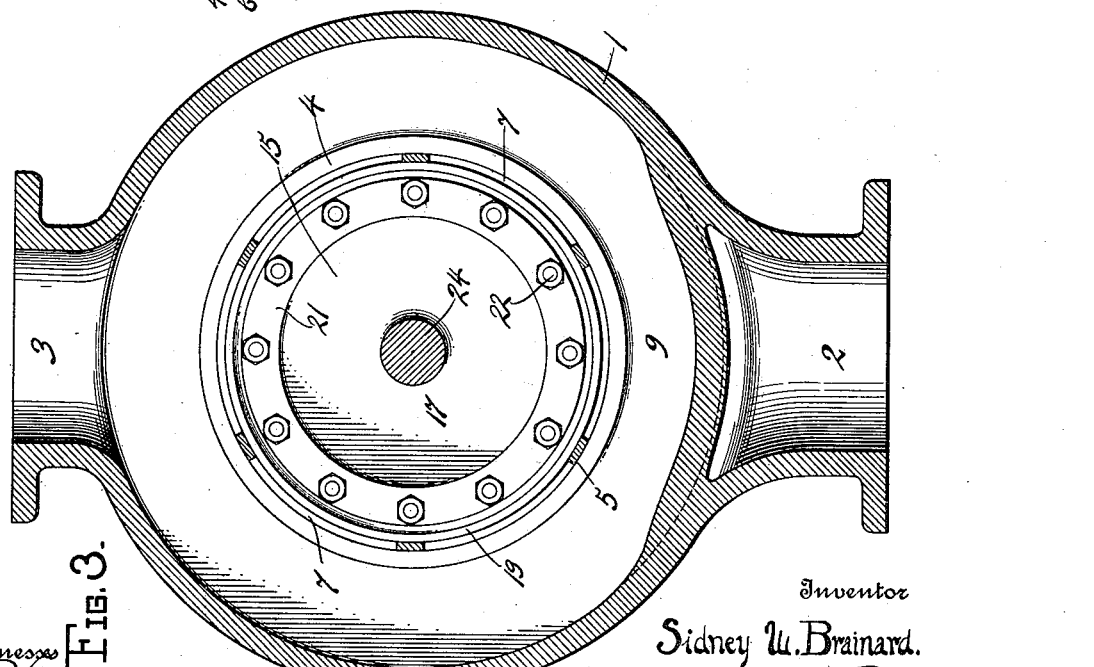

SIDNEY W. BRAINARD, OF CLEVELAND, OHIO, ASSIGNOR TO JOHN M. DUNCAN, OF PHILADELPHIA, PENNSYLVANIA.

VALVE MECHANISM.

1,210,757. Specification of Letters Patent. Patented Jan. 2, 1917.

Application filed May 5, 1916. Serial No. 95,536.

*To all whom it may concern:*

Be it known that I, SIDNEY W. BRAINARD, a citizen of the United States, residing at Cleveland, in the county of Cuyahoga and State of Ohio, have invented certain new and useful Improvements in Valve Mechanisms, of which the following is a specification.

My invention consists of improved valve mechanism, and is particularly serviceable for use in connection with what is known as the "dry pipe system of automatic sprinklers" where the pipes which lead from the valve to the sprinklers normally contain air under pressure, however I wish it to be understood that my improved valve mechanism may be used with advantage in other places if it is so desired.

One object of my invention is to provide valve mechanism which will operate with very little friction, and which will be automatically controlled.

A further object of my invention is to provide a valve which will effect the opening and closing of a water inlet and a water outlet, said valve being balanced and automatically operated.

Another object of my invention is to provide an efficient controlling means which will operate automatically upon the reduction of air pressure in the outlet passage to effect the movement of the balanced valve above mentioned to permit the direct flow of the water through the inlet passage and the outlet passage.

A still further object of my invention is to so construct valve mechanism of the above described type that it will be quick and positive in its action, of simple construction and durable, and can be manufactured at a reasonably low cost.

These objects, and other advantageous ends which will be described hereinafter, I attain in the following manner, reference being had to the accompanying drawings in which—

Figure 1 is a sectional elevation of my improved valve mechanism showing the same as forming a closure for the inlet and outlet passages. Fig. 2 is a view of similar character to that shown in Fig. 1 showing the above mentioned passages open and certain of the elements in a different position from that shown in Fig. 1. Fig. 3 is a transverse sectional view taken on the line *a—a* Fig. 1, a piston which I employ being shown in full lines and its stem being shown in section. Fig. 4 is a sectional elevation of one portion of the frame which I employ and drawn on a smaller scale than the previously mentioned figures. Fig. 5 is a section taken on the line *b—b* of Fig. 4. Fig. 6 is a view of one portion of my improved balanced valve. Fig. 7 is a side elevation of a bushing which I preferably use. Fig. 8 is a fragmentary elevation showing a modified form of casing.

Referring to the drawings, 1 is a casing having an inlet passage 2 and an outlet passage 3, and a centrally extending chamber 4 which is circular in cross section and has a bushing or sleeve 5 securely fitted therein. The inlet passage 2 is in direct communication with an annularly extending passageway 6, this passage being clearly shown in Figs. 4 and 5, and extends entirely around said bushing 5. The bushing 5 has a series of openings or ports 7 positioned in direct circular formation, and these ports form a means of communication between the annular passage 6 and the space 8 provided within the bushing 5.

The outlet passage 3 is in direct communication with an annularly extending passage 9, the latter extending entirely around the bushing 5. The bushing 5 is provided with a second series of openings 10 which are substantially similar to the openings 7 and form a means of communication between the space 8 and the annular passage 9 under certain conditions in the movement of the valve as will be hereinafter more fully described.

The width of the openings 7 and 10 are substantially equal to the width of the passages 6 and 9 where the latter intersect the chamber 4, it being noted from Fig. 5 that the passages 6 and 9 extend in an undercut formation, thereby providing a large cross sectional area and consequently a comparatively large space. The chamber 4 is closed at one end by means of a head 11 which is secured to the end 12 of the casing 1 by means of bolts 13.

A valve 14 which will hereinafter be termed a balanced valve, is slidable within the space 8 provided by the bushing 5 and consists of two principal sections 15 and 16. These sections are cylindrical and operate as pistons within the chamber 8, and are of the same diameter. The section 15 consists of a head 17 which has packing rings 18 and 19 secured to opposite faces thereof, said packing rings being held in position by two annular rings 20 and 21, the latter being clamped together by bolts 22. The outer edge of the head 17 has fitted thereto a ring 23 which may be of brass or other metal, the outer surface of which contacts with the inner surface of the bushing 5. This ring 23 is preferably made wider at its outer surface than where it contacts with the head 17 and forms a snug backing for the packing rings 18 and 19.

The head 17 has a centrally projecting stem 24 which is reduced in size and screw-threaded as shown at 25. The head 17 is provided on its opposite surface with a projection 26 designed to engage an inwardly projecting extension or stop 27 on the head 11 on the outer end of the casing 1. The opposite section 16 includes a head 28 which has a central opening into which the threaded end 25 of the stem 24 extends, the shoulder 29 formed by the reduced end 25 forms an abutment for the head 28, and nuts 30 on the outer end of the portion 25 serve to securely bind the head 16 to the stem 24. The head 16 is also provided with two packing rings 31 and 32 which are of the same size as the rings 18 and 19, and are designed to engage the inner surface of the bushing 5 during the operation of the valve.

The packing rings 31 and 32 are held in engagement with the head 28 by rings 33 and 34 which are similar to the rings 20 and 21, and bolts 35 tend to bind the rings 33 and 34, with the packing rings 31 and 32 between them, to the head 28. A ring 36 surrounds the outer edge of the head 28, and is of the same construction and for the same purpose as is the ring 23. With this construction, it will be understood that each section 15 and 16 includes a piston, and these pistons are of the same outer diameter and are spaced apart by the stem 24 to produce a balanced valve as will be hereinafter more fully described.

The casing 1 includes an auxiliary casing 37 having a vertically extending opening 38 in which is tightly fitted a bushing 39 which provides a valve chamber 40. This auxiliary casing 37 also has an opening 41 which is in axial alinement with the chamber 40 but of a smaller diameter than the latter. Into this opening 41 is fitted a flanged sleeve or bushing 42 having an opening 43 which is also in axial alinement with the chamber 40, and much smaller in diameter than the latter.

A series of ports 44 communicate with the chamber 40 and lead into a passage or duct 45, the latter communicating with the chamber 8. These ports 44 are preferably arranged in annular formation around the axis of the opening 43 and under certain conditions permit fluid under pressure to enter the chamber 40.

A passage 46 communicates with the passage 45 and a pipe 47 leads into the passage 46, this pipe having a section 48 which communicates with the main inlet 2 and also includes a valve 49 (see Figs. 1 and 2). The passage 46 has fitted therein a sleeve bushing 50, the internal diameter of the latter being the same as the passage 43, and in direct alinement therewith.

A valve 51 of the piston type has a cylindrical piston 52 comprising a head 53 having secured at opposite faces packing rings 54 and 55, the latter being of the same diameter and engaging the inner surface of the bushing 39. Securing rings 56 and 57 engage the packing rings, and bolts 58 clamp the rings 56 and 57, with the packing rings therebetween, to the head 53.

The head 53 of the valve 51 has a central downwardly projecting stem 59 which is reduced in diameter at its lower portion as shown at 60, thus providing a shoulder 61. The portion 60 of the stem has a sleeve 62 rigidly fitted thereon, the thickness of this sleeve being such that its outer diameter is less than the outer diameter of the large portion of the stem 59, so that even though this sleeve is so mounted, there is still a portion of the shoulder 61 which projects beyond the outer diameter of the sleeve 62, so that the shoulder 61 acts as a stop to limit the downward movement of the valve 51 by engaging the upper flanged surface of the bushing 42.

The extreme lowest portion of the stem 59 is reduced in diameter to provide a space for a packing ring 63, the latter being U-shape in cross section, and together with the sleeve 62 is designed to closely fit the inner surface of the bushing 42. The packing ring 63 is secured in place by means of a plate 64 which is secured to the lower end of the stem 59 by a screw 65 or other similar means. By this construction as just described, it will be understood that a valve of the piston type is provided which has an upper portion of extremely large diameter and operative within the chamber 40, and a portion of the smaller diameter operative within the passage 43 and opening 46, so that when the larger portion moves within its chamber 40, the portion of smaller diameter will move within the passages 43 and 46 and across the passage 45, in other words, from the position shown in Fig. 1 to the position shown in Fig. 2.

The upper end of the chamber 40 is closed by a cylinder head or end 66 which is secured to the auxiliary casing 37 by bolts 67. An outlet passage 68 enters the upper portion of the chamber 40, and has leading therein a pipe 69 which connects with an air pressure pipe 70 and a priming water pipe 71 having a primer 72 connected therewith. The pipe 70 may be attached directly to the sprinkler system or may be coupled with a pipe leading from the outlet 3. However, this pipe 70 may be coupled to any apparatus which will act, such for example in case of fire, to release or reduce the pressure therein. The pipe 70 has a valve 73 therein, and the pipe 72 has a valve 74, and these latter two valves may be operated either to open or close their respective pipes. Another pipe 75 communicates with the pipes 70 and 71 and leads to an opening 76 (shown in full lines Fig. 4, and in dotted lines Figs. 1 and 2) so that the upper portion of the valve 51 and the outer end of the casing 8 may be primed with water as is considered desirable in all valve constructions where it is desired to insure an even fitting of the movable parts of the valve with their contacting surfaces.

I will describe the operation of my improved valve mechanism in connection with a dry pipe sprinkler system, and it will be further considered that the outlet 3 is in direct communication with the sprinkler system and contains air under pressure, and that if any of the sprinklers throughout the system are operated due to fire or other means, the pressure in said outlet 3 will be reduced as will also be the pressure within the pipes 69, 70, and 75. Furthermore, it will be considered that the inlet passage 2 is in direct communication with the main water supply, and that the valves 49 and 74 are closed. With these conditions, the water pressure will be operative against the bottom of the stem 59 of the valve 51, and the balanced valve 14 will be in a position to close the ports or openings 10. Furthermore, the inlet passage 2 will be in direct communication with the space between the two pistons of the balanced valve, so that said latter space will be completely filled with water, the valve mechanism in this position being clearly shown in Fig. 1 of the drawing.

If for any reason, for example the operation of any of the sprinkler heads, the pressure in the system is reduced, the pressure on the forward end of the balanced valve 14 will be reduced as will be the pressure in the extreme upper portion of the chamber 40.

The areas of the several pistons as above described are such that upon the reduction of pressure, as just described, the incoming water pressure on the reduced end of the valve 51 will move said latter valve upwardly, and permit the water to flow through the passages 46 and 45 into the chamber 8 at the rear end of the balanced valve 14. In view of the fact that this water pressure is greater than the reduced air pressure at the front end of the balanced valve, said valve 14 will move forwardly until the forward piston thereof has uncovered the ports 10, throwing them in direct communication with the incoming water through the passage 2 and the water will flow directly out through the passage 3 to the system of sprinklers. The piston 51, being constructed in accordance with my invention, will act as a differential control, and as soon as the smaller end passes out of the passage 46, the water will immediately pass to the chamber 8 and upwardly through the ports 44, thence tending to accelerate the movement of the large head of the differential valve 51, and also quickly move the said balanced valve 14.

I have mentioned the valve 14 as being a balanced valve because the water which passes therethrough from the main inlet 2 will bear equally against the piston heads. This water pressure will force the packing rings into a tight bearing in the cylinder, so that the balanced valve will operate with practically no friction.

The fact that the passages 9 and 6 in the main casing 1 are annular and extend completely around the bushing 5, and also that these passages are extremely large, will permit a ready flow of water so that the valve will operate quickly. Furthermore, the fact that the openings 10 in the bushing which lead to the annular passage 9 and thence to the outlet passage 3 only allow the pressure to engage the outer surface of the ring 23 on the forward piston of the balanced valve, this pressure will produce very little resistance when the valve is in normal position as clearly shown in Fig. 1.

While I consider the balanced valve feature of my invention as quite important, in its relation with the inlet and outlet passages, I also consider that the construction and mode of operation of the valve 51 as also being important, since by it I secure quick and automatic movement of the said balanced valve, and while the balanced valve may be operated by means other than the valve 51, I consider that the combination of these two valves are of great importance.

After the valve mechanism has operated as above described, it may be drained by opening the valve 49 and reprimed by opening the valve 74, vents 77 and 78 being provided within the passages 9 and 2 respectively which may be opened and closed by any means desired.

It will be understood that the valve 51 will not move into its open position until the pressure above the enlarged piston thereon is reduced. This reduction of pressure together with the reduction of the pressure in the chamber 4 in front of the forward piston of the balanced valve 14, takes place simultaneously so that the balanced valve is free to be moved by the incoming water through the passage 45 as soon as the valve 51 starts to move upwardly.

The movement of the balanced valve 14 in a forward direction is stopped by the portion 26 coming in contact with the extension 27, and the movement of the said balanced valve in the opposite direction is stopped by the end 25 of the stem coming in contact with a projection 25ª on the auxiliary frame 37.

In Fig. 8 I have shown a slight modification of the casing 1 at a point adjacent the auxiliary casing 37. In some instances this form may be used as it gives an increased cross sectional area of the chamber 8 at the point where the passage 45 intersects it.

In certain of the appended claims I have used the term "floating balanced valve" to mean that the valve has no members which are coupled to any solid or movable portion of an actuating device of any description, since it will be readily understood from the foregoing description and from the accompanying drawings that my improved balanced valve receives its motion directly from fluid entering the passage 45, and there are no portions which extend from said balanced valve to the outer part of the casing.

While I have described my invention as taking one particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The combination in valve mechanism, of a casing having an inlet and an outlet passage, a balanced valve including pistons spaced apart, the peripheral surface of one of said pistons being designed to close said outlet passage, said casing having other passages communicating with each other and with opposite faces of one of the pistons of said balanced valve, a differential valve normally interposed between said latter passages, said casing having another passage containing fluid under pressure and operative to normally hold the differential valve in said interposed position, said latter fluid when reduced in pressure permitting the movement of the differential valve by the pressure fluid in said second-mentioned passages to operate the balanced valve to open the inlet and outlet passages, substantially as described.

2. The combination in valve mechanism, of a casing having an outlet passage and an inlet passage containing fluid under pressure, a balanced valve interposed between said passages including pistons spaced apart, the peripheral surface of one of said pistons being designed to close said outlet passage, said casing having other passages communicating with each other and with opposite faces of one of the pistons of said balanced valve, a differential valve interposed between said other passages in said casing, certain of said latter passages containing fluid under pressure, said casing having another passage for fluid under pressure, said latter passage being connected to the differential valve and operative to normally hold the differential valve in said interposed position, said latter fluid when reduced in pressure permitting the movement of the differential valve by the fluid in said second-mentioned passages to automatically effect movement of the balanced valve to open the inlet and outlet passages, substantially as described.

3. The combination in valve mechanism, of a casing having inlet and outlet passages, a balanced valve interposed between said passages, said valve including members spaced apart and movable in conjunction with each other, said valve normally closing the outlet passage, the space between said members acting, when the valve is moved, to form a direct passageway between the inlet and outlet passages, substantially as described.

4. The combination in valve mechanism, of a casing having inlet and outlet passages, a balanced valve interposed between said passages and including two pistons of the same diameter spaced apart, said valve normally closing the outlet passage, the space between said pistons acting when the valve is moved to form a direct passageway between the inlet and the outlet passages, substantially as described.

5. The combination in valve mechanism, of a casing having an inlet and an outlet passage, a balanced valve normally closing said passages, a differential valve, said casing having a passage leading between said valves, and a passage connecting said valves and containing fluid under pressure, said latter passage communicating with but being normally cut off from the third passage by the differential valve, said casing having another passage leading to the differential valve and normally containing fluid under pressure, said fluid when reduced in pressure permitting the fluid in said connecting passage to move the balanced valve to permit communication between the inlet and outlet passages, substantially as described.

6. The combination in valve mechanism, of a casing having a valve chamber and inlet and outlet passages laterally intersecting said chamber, a balanced valve in said chamber and interposed between said passages, said valve including two cylindrical pistons spaced apart, one of said pistons in its normal position having its peripheral surface covering and forming a closure for the outlet passage, said inlet passage opening into the space between the pistons, substantially as described.

7. The combination in valve mechanism, of a casing having a valve chamber, and inlet and outlet passages intersecting said chamber, a balanced valve in said chamber interposed between said passages, said valve including two cylindrical pistons of the same diameter and spaced apart, one of said pistons in its normal position having its peripheral surface forming a closure for the outlet passage, and said inlet passage opening into the space between the pistons, substantially as described.

8. The combination in valve mechanism, of a casing having a valve chamber, and inlet and outlet passages intersecting said chamber, a balanced valve in said chamber interposed between said passages, said valve including two cylindrical pistons spaced apart, one of said pistons in its normal position having its peripheral surface forming the entire covering for the outlet passage, said inlet passage opening into the space between the pistons, a passage in said casing communicating with the outer face of one of the pistons, and means operative to allow liquid to flow through said latter passage to move said balanced valve, substantially as described.

9. The combination in valve mechanism, of a valve casing having inlet and outlet ports, a balanced valve including pistons spaced apart, the peripheral surface of one of said pistons being designed to close said outlet passage, said casing having other passages one of which is designed to convey fluid under pressure, said latter passages communicating with each other and with opposite sides of said balanced valve, a differential valve normally interposed between said passages, said casing having another passage connected to said differential valve for supplying fluid under pressure to normally hold the differential valve in said interposed position, said latter fluid when reduced in pressure permitting the movement of the differential valve out of said interposed position by the fluid pressure in said second-mentioned passages, said latter movement of the differential valve serving to permit said latter fluid to move the balanced valve and thereby open said inlet and outlet passages, substantially as described.

10. The combination in valve mechanism, of a casing having inlet and outlet passages, a balanced valve interposed between said passages and including two pistons spaced apart, one of said pistons in its normal position having its peripheral surface forming a closure for the outlet passage, said inlet passage opening into the space between the pistons, said casing having a passage communicating with the outer face of one of the pistons, said casing having another passage communicating with the last-named passage and with the inlet containing fluid under pressure, a differential valve interposed between said latter passages and normally operative to cut off communication between the same, said casing having another passage connected to the differential valve and containing liquid under pressure for holding the differential valve in said interposed position, said latter fluid when reduced in pressure permitting the movement of the differential valve by the pressure fluid in one of the other passages to permit said latter fluid to enter said communicating passage and thereby operate the balanced valve to open the inlet and outlet passages, substantially as described.

11. The combination in valve mechanism, of a casing having inlet and outlet passages, a balanced valve interposed between said passages, and including two pistons spaced apart, one of said pistons in its normal position having its outer edge forming a closure for the outlet passage, said inlet passage opening into the space between the pistons, a passage in said casing communicating with the outer face of one of the pistons, and a valve movable within said casing having a piston head of large diameter and a stem of smaller diameter, said stem being operative to normally close said latter passage, the total pressure on said head being normally greater than the pressure on said valve stem and thereby normally keeping said valve closed, said latter valve being operated due to the pressure on said valve stem when the pressure on said enlarged portion is reduced to effect the flow of liquid through the passage to the inner surface of the said balanced valve head to move the said balanced valve into position to permit communication between the outlet and inlet passages, substantially as described.

12. The combination in valve mechanism, of a valve casing having inlet and outlet passages and a valve chamber, annular passages surrounding the valve chamber and communicating therewith, one of said annular passages leading to the inlet passage, the other of the annular passages leading to the outlet passage, a balanced valve movable within the valve chamber and including two pistons spaced apart, one of said pistons normally closing the annular passage which leads to the outlet passage, the other of the annular passages being in communication with the space between the two pistons, substantially as described.

13. The combination in valve mechanism, of a valve casing having inlet and outlet passages and a valve chamber, annular passages surrounding the valve chamber and communicating therewith, one of said annular passages leading to the inlet passage, the other of the annular passages leading to the outlet passage, a balanced valve movable within the valve chamber and including two pistons spaced apart and of the same diameter, one of said pistons normally closing the annular passage which leads to the outlet passage, the other of the annular passages being in communication with the space between the two pistons, substantially as described.

14. The combination in valve mechanism, of a valve casing having inlet and outlet passages and a valve chamber, annular passages surrounding the valve chamber and communicating therewith, one of said annular passages leading to the inlet passage, the other of the annular passages leading to the outlet passage, a balanced valve movable within the valve chamber and including two pistons spaced apart, one of said pistons normally closing the annular passage which leads to the outlet passage, the other of the annular passages being in communication with the space between the two pistons, a second valve chamber in said casing, a valve movable therein and having a large piston head fitting said chamber, and a stem of small diameter extending from said head, said casing having a passage communicating with said first valve chamber, and an opening leading from said latter passage into the second valve chamber, said opening being of a diameter equal to the outer diameter of said second valve stem, a passage in alinement with said opening and for receiving said second valve stem, a pipe forming communication between said latter passage and the first-mentioned inlet, said valve stem being movable into and out of said latter passage, and means forming communication between the second valve chamber and the outlet passage and communicating with the first valve casing at a point in front of the forward piston of the balanced valve, substantially as described.

15. The combination in valve mechanism, of a valve casing having inlet and outlet passages, and a valve chamber, annular passages surrounding the valve chamber and communicating therewith, one of said annular passages leading to the inlet passage, the other of the annular passages leading to the outlet passage, a balanced valve movable within the valve chamber and including two pistons spaced apart, one of said pistons normally closing the annular passage which leads to the outlet passage, the other of the annular passages being in communication with the space between the two pistons, a second valve chamber in said casing, a valve movable therein and having a large piston head fitting said chamber, and a stem of small diameter extending from said head, said casing having a passage communicating with said first valve chamber, and an opening leading from said latter passage into the second valve chamber, said opening being of a diameter equal to the outer diameter of said second valve stem, a passage in alinement with said opening and for receiving said second valve stem, a pipe forming communication between said latter passage and the first-mentioned inlet, said valve stem being movable into and out of said latter passage, means forming communication between the second valve chamber and the outlet passage and communicating with the first valve casing at a point in front of the forward piston of the balanced valve, said valve casing having a series of ports communicating with the second valve chamber and the passage which leads to the inner face of the piston head of the said balanced valve, substantially as described.

16. The combination in valve mechanism, of a casing having a valve chamber and inlet and outlet passages, a balanced valve including two pistons of equal diameter spaced apart to permit said inlet passage always to be in communication with the space between the pistons to provide a balance for said valve, the peripheral surface of one of said pistons normally closing communication between said passages, and means for admitting fluid directly to the outer face of the other of said pistons to move the latter to open said passages, substantially as described.

17. The combination in valve mechanism, of a casing having a valve chamber and inlet and outlet passages intersecting said chamber at an angle to its axis, a balanced valve slidably fitting said chamber and interposed between said passages, said valve including two cylindrical pistons spaced apart, one of said pistons in its normal position having its peripheral surface forming an entire covering for said outlet passage, said inlet passage opening into the space between the pistons, substantially as described.

18. The combination in valve mechanism, of a casing having a valve chamber, and an inlet passage for conveying fluid under pressure, a differential valve having a cylindrical piston slidably fitting said chamber and having a cylindrical stem of reduced diameter normally fitting and closing said passage, said casing having a second passage containing fluid under pressure operative on one face of said piston, and ports communicating directly with the opposite face of said piston and with said first passage, said stem normally fitting and closing said first passage, said stem being movable by the fluid pressure in the first passage when the pressure of fluid in the second passage is reduced, said ports being operative to convey fluid pressure directly to the piston to accelerate the movement of the valve as soon as the stem is moved out of said first passage, substantially as described.

In testimony whereof I have signed my name to this specification in the presence of two subscribing witnesses.

SIDNEY W. BRAINARD.

Witnesses:
J. E. ADCOCK,
E. F. KAVANAGH.

Copies of this patent may be obtained for five cents each, by addressing the "Commissioner of Patents, Washington, D. C."